(12) United States Patent
Smits (10) Patent No.: US 12,028,142 B2
(45) Date of Patent: Jul. 2, 2024

(54) MOTOR VEHICLE WITH ANTENNA NETWORK

(71) Applicant: Continental Automotive GmbH, Hannover (DE)

(72) Inventor: Thomas Smits, Straelen (DE)

(73) Assignee: Continental Automotive GmbH, Hannover (DE)

( * ) Notice: Subject to any disclaimer, the term of this patent is extended or adjusted under 35 U.S.C. 154(b) by 135 days.

(21) Appl. No.: 17/616,419

(22) PCT Filed: Jun. 2, 2020

(86) PCT No.: PCT/EP2020/065195
§ 371 (c)(1),
(2) Date: Dec. 3, 2021

(87) PCT Pub. No.: WO2020/245107
PCT Pub. Date: Dec. 10, 2020

(65) Prior Publication Data
US 2022/0329311 A1   Oct. 13, 2022

(30) Foreign Application Priority Data

Jun. 4, 2019   (DE) .................... 10 2019 208 098.7

(51) Int. Cl.
*H04B 7/06*   (2006.01)
*H04L 67/12*   (2022.01)

(52) U.S. Cl.
CPC ........... *H04B 7/0691* (2013.01); *H04L 67/12* (2013.01)

(58) Field of Classification Search
CPC ...... H04B 7/0691; H04B 7/0693; H04B 7/08; H04B 7/08202; H04B 7/0817; H04B 7/0868; H04B 7/0871; H04B 1/06; H04B 1/08; H04B 1/082; H04B 1/086; H04B 1/38; H04B 1/3822; H04B 7/14; H04B 7/145; H04B 7/15; H04B 7/155; H04B 7/15528; H04B 7/1555; H04L 67/12; H04L 67/01; H04L 67/28; H04L 67/40;
(Continued)

(56) References Cited

U.S. PATENT DOCUMENTS

| | | | |
|---|---|---|---|
| 7,336,969 B2* | 2/2008 | Minnick | H04W 36/22 455/445 |
| 8,688,376 B2* | 4/2014 | Stahlin | H04W 4/90 340/426.36 |

(Continued)

FOREIGN PATENT DOCUMENTS

| | | |
|---|---|---|
| CN | 102812592 A | 12/2012 |
| CN | 204383317 U | 6/2015 |

(Continued)

OTHER PUBLICATIONS

Office Action dated Mar. 13, 2020 from corresponding German patent application No. DE 10 2019 208 098.7.

(Continued)

*Primary Examiner* — James M Perez (57) ABSTRACT

A motor vehicle comprises a towing vehicle and an antenna network which has at least two antenna units with identical network addresses, wherein the two antenna units are arranged on different side surfaces of the towing vehicles and are digitally connected.

11 Claims, 5 Drawing Sheets

(58) Field of Classification Search
CPC ....... H04L 67/40267; H04L 67/40273; H04W 4/30; H04W 4/40; H04W 4/42; H04W 4/44; H04W 4/46; H04W 4/48; H04W 88/00; H04W 88/02; H04W 88/04; H04W 88/06; H04W 88/08; H04W 88/085; H04W 88/10; B60R 11/02; B60R 11/0288; B60R 11/0294
See application file for complete search history.

(56) References Cited

U.S. PATENT DOCUMENTS

| | | | |
|---|---|---|---|
| 8,742,914 B2* | 6/2014 | Deniau | B60C 23/0455 73/146 |
| 8,744,397 B2* | 6/2014 | Gee | H04L 67/306 701/45 |
| 8,892,090 B2* | 11/2014 | Gee | H04W 4/40 455/575.9 |
| 9,264,112 B2* | 2/2016 | Menzel | H04B 7/0871 |
| 9,306,639 B2* | 4/2016 | Burchard | H04B 7/026 |
| 9,401,826 B2* | 7/2016 | Eitel | H04L 25/0238 |
| 9,517,664 B2* | 12/2016 | McIntyre | H04L 43/18 |
| 9,577,817 B2* | 2/2017 | Yun | H04J 3/0641 |
| 9,973,725 B2* | 5/2018 | Zhong | H04N 5/64 |
| 10,027,375 B2* | 7/2018 | Cheikh | H04B 7/145 |
| 10,182,249 B2* | 1/2019 | Kuhlmann | H04N 21/25841 |
| 10,220,660 B2* | 3/2019 | McIntyre | B60C 23/0471 |
| 10,419,200 B2* | 9/2019 | Takahashi | H04L 7/0025 |
| 10,484,850 B2* | 11/2019 | Kwoczek | H04L 69/14 |
| 10,525,934 B1* | 1/2020 | Gilbert-Eyres | B60R 25/102 |
| 10,536,196 B2* | 1/2020 | Geng | H04B 7/0413 |
| 10,710,418 B2* | 7/2020 | Fischer | B60C 23/0489 |
| 10,771,119 B2* | 9/2020 | Weinfield | H04B 7/0871 |
| 10,889,266 B2* | 1/2021 | Godet | B60R 25/01 |
| 10,985,805 B2* | 4/2021 | Van Meurs | H04W 56/0015 |
| 11,218,849 B2* | 1/2022 | Stählin | H04L 67/12 |
| 11,527,160 B2* | 12/2022 | Swan | G01S 13/91 |
| 11,838,151 B1* | 12/2023 | Jones | H04L 25/022 |
| 2002/0184641 A1* | 12/2002 | Johnson | H04N 7/17318 348/E7.071 |
| 2007/0149184 A1* | 6/2007 | Viegers | G08G 1/20 701/519 |
| 2007/0185626 A1* | 8/2007 | Kaneko | G07C 5/008 701/2 |
| 2008/0203308 A1* | 8/2008 | Yoo | G01J 1/0252 250/352 |
| 2009/0037525 A1* | 2/2009 | Asahara | H04L 67/1012 709/203 |
| 2009/0092134 A1* | 4/2009 | Herrera Schuvab | G06Q 30/0283 705/400 |
| 2010/0073125 A1* | 3/2010 | Alrabady | H04L 9/3247 340/5.2 |
| 2010/0234071 A1* | 9/2010 | Shabtay | H04B 7/155 455/562.1 |
| 2011/0298638 A1* | 12/2011 | Groeneweg | G08G 1/20 340/905 |
| 2012/0225634 A1* | 9/2012 | Gee | H04W 4/90 455/404.1 |
| 2012/0252431 A1* | 10/2012 | Gee | H04W 4/90 455/422.1 |
| 2012/0268293 A1* | 10/2012 | Stahlin | H04W 4/44 340/901 |
| 2013/0038436 A1* | 2/2013 | Brey | B60T 7/16 701/1 |
| 2013/0041524 A1* | 2/2013 | Brey | G07C 5/08 701/2 |
| 2013/0058253 A1* | 3/2013 | Maruta | H04L 67/12 370/254 |
| 2013/0158862 A1* | 6/2013 | Stahlin | G08G 1/162 455/39 |
| 2013/0201316 A1* | 8/2013 | Binder | H04L 67/12 701/2 |
| 2013/0210366 A1* | 8/2013 | Hansen | H01Q 21/29 343/893 |
| 2014/0045541 A1* | 2/2014 | Moshfeghi | H04B 17/336 455/500 |
| 2014/0148093 A1* | 5/2014 | Nguyen | H04B 7/15507 455/11.1 |
| 2015/0109962 A1* | 4/2015 | Liao | H04L 12/6418 370/254 |
| 2015/0351084 A1* | 12/2015 | Werb | H04W 12/08 370/329 |
| 2016/0359741 A1* | 12/2016 | Cooper | H04W 4/44 |
| 2016/0366711 A1* | 12/2016 | Shanbhag | H04L 67/12 |
| 2017/0090473 A1* | 3/2017 | Cooper | H04W 76/11 |
| 2017/0250905 A1* | 8/2017 | Park | H04L 45/66 |
| 2018/0013580 A1* | 1/2018 | Takatori | H04L 61/2514 |
| 2018/0192464 A1* | 7/2018 | Park | H04B 7/0413 |
| 2018/0234844 A1* | 8/2018 | Lavi | H04W 12/088 |
| 2018/0242127 A1* | 8/2018 | Kwoczek | H04W 76/10 |
| 2018/0343304 A1* | 11/2018 | Binder | H04L 67/12 |
| 2019/0020530 A1* | 1/2019 | Au | H04W 72/21 |
| 2019/0268741 A1* | 8/2019 | Shen | H04W 76/10 |
| 2019/0276055 A1* | 9/2019 | Cooper | B60L 15/34 |
| 2020/0119775 A1* | 4/2020 | Park | G08G 1/096783 |
| 2020/0120064 A1* | 4/2020 | Cho | H04L 61/5007 |
| 2020/0196119 A1* | 6/2020 | Stählin | H04W 88/06 |
| 2020/0198647 A1* | 6/2020 | Frederick | G07C 5/008 |
| 2020/0229206 A1* | 7/2020 | Badic | H04W 16/32 |
| 2020/0236520 A1* | 7/2020 | Kumabe | H04W 4/023 |
| 2021/0053490 A1* | 2/2021 | Smits | H04N 7/181 |
| 2021/0218830 A1* | 7/2021 | Liu | G07C 5/0808 |
| 2021/0266295 A1* | 8/2021 | Stroz | H04L 63/0263 |
| 2021/0328943 A1* | 10/2021 | Jones | H04L 49/351 |
| 2021/0337460 A1* | 10/2021 | Breaux, III | H04W 48/04 |
| 2021/0390859 A1* | 12/2021 | Swan | G02B 5/122 |
| 2022/0009462 A1* | 1/2022 | Wolf | B61H 13/00 |
| 2022/0053449 A1* | 2/2022 | Shan | H04W 4/40 |
| 2022/0086741 A1* | 3/2022 | Liao | H04W 4/44 |
| 2022/0095260 A1* | 3/2022 | Shan | H04W 60/04 |
| 2022/0266876 A1* | 8/2022 | Cooper | B60T 13/665 |
| 2022/0329311 A1* | 10/2022 | Smits | H04W 4/40 |
| 2023/0059220 A1* | 2/2023 | Strunck | H04W 4/40 |
| 2023/0256780 A1* | 8/2023 | Houston | B60C 23/0479 701/29.4 |

FOREIGN PATENT DOCUMENTS

| | | |
|---|---|---|
| DE | 102015201476 A1 | 7/2016 |
| DE | 102015114285 A1 | 3/2017 |
| DE | 102016226053 A1 | 6/2018 |
| DE | 102018206598 B3 | 9/2019 |
| JP | H08279778 A | 10/1996 |
| JP | 2001334896 A | 12/2001 |
| JP | 2005117614 A | 4/2005 |
| JP | 3113531 U | 9/2005 |
| JP | 2005268924 A | 9/2005 |
| KR | 20140050805 A | 4/2014 |
| WO | 2019206995 A1 | 10/2019 |

OTHER PUBLICATIONS

International Search Report and Written Opinion dated Aug. 27, 2020 from corresponding International Patent application No. PCT/EP2020/065195.
Notification of Reasons for Refusal dated Jan. 24, 2023 from corresponding Japanese patent application No. 2021-571730.
Final Notification of Reasons for Refusal dated Jul. 25, 2023 from corresponding Japanese patent application No. 2021-571730.
Office Action dated Nov. 1, 2023 from corresponding Chinese patent application No. 202080040884.7.

* cited by examiner

MOTOR VEHICLE WITH ANTENNA NETWORK

CROSS-REFERENCE TO RELATED APPLICATION

This U.S. patent application claims the benefit of PCT patent application No. PCT/EP2019/083507, filed Dec. 3, 2019, which claims the benefit of German patent application No. 10 2019 208 098.7, filed Jun. 4, 2019, both of which are hereby incorporated by reference.

TECHNICAL FIELD

The invention relates to a motor vehicle with an antenna network which has a plurality of active antenna units that are connected to one another.

BACKGROUND

In the motor vehicle sector, especially in the field of commercial vehicles such as trucks, construction machinery or agricultural machinery, various challenges arise for wireless communication or data transmission between motor vehicles or between motor vehicles and an infrastructure or other terminals or technical equipment due to the specific communication properties. Mobility and non-stationary use result in increased requirements due to multipath propagation and the resulting fading effects, Doppler effects, etc. Furthermore, there are limits to the arrangement, in particular due to the geometric dimensions of the commercial vehicles and structural specifications for possible installation positions of transmitting/receiving antennas, amplifiers, receivers, etc. In addition, vehicle chassis and superstructures are mainly constructed from metal, leading to reflections, shadows or absorptions. Another aspect to be considered is the cost sensitivity in the automotive sector and the need for robust, reliable and, in addition, economical solutions.

In a conventional architecture, transmitting and/or receiving antennas as well as the associated output stages or amplifiers are connected in an analog manner within the respective motor vehicle via coaxial cables. However, in order to keep the attenuation losses of the coaxial cables as low as possible, it is desirable to keep the cable lengths as short as possible. Coaxial cables with low attenuation values, in particular in a frequency range from 5 GHz to 5.9 GHz, generate relatively high costs. The limited bending radii of the coaxial cables are also disadvantageous.

It is therefore known practice to place so-called compensator circuits close to the antenna, which amplify the signals on both the receiving and the transmitting side, in order to thus be able to compensate for the attenuation losses. Since these compensator circuits amplify the signals in analog form, there are disadvantages due to the amplification of distortions and non-linearities, noise and the switching that becomes necessary between transmission and reception.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The not previously published DE 10 2018 206 598 with the title "Method for operating an antenna unit, antenna unit and antenna network", the content of which is intended to form part of the present disclosure by reference, describes an antenna network in which a plurality of antennas are digitally connected to one another in order to thus enable a motor vehicle to have a reliable communication connection to external communication devices outside the antenna network.

A motor vehicle, in particular a commercial vehicle such as a truck, has a towing vehicle defined by at least four side surfaces and an antenna network with at least two antenna units which are assigned an identical network address. The at least two antenna units are arranged on different side surfaces of the at least four side surfaces of the towing vehicle and each have at least one antenna and one network interface. The network interfaces of the at least two antenna units are designed to receive a data packet with the same data content transmitted to the at least two antenna units, to respectively provide, on the basis of a specified communication protocol, a transmission data packet which comprises the data content of the received data packet and the assigned, identical, network address of the at least two antenna units, and to transmit the transmission data packet provided via the respective antenna.

During a communication phase, the at least two antenna units receive a multiplicity of data packets via the network interface, so that the two antenna units are digitally connected to a unit that provides the data packet to be received. Due to the digital connection, the at least two antenna units can be arranged at any position on the motor vehicle. Particularly, in the case of commercial vehicles, for example trucks, which are mostly made up of a towing vehicle and a trailer, it can be assumed that the trailers are frequently changed and in some cases also provided by external companies. It is therefore advantageous to arrange elements of communication technology, for example V2X, Wifi, etc., on the towing vehicle of the motor vehicle. In order to enable the communication to be covered in a plurality of directions starting from the towing vehicle, the at least two antenna units may be arranged on different side surfaces of the towing vehicle that define the towing vehicle.

The at least two antenna units may be designed to receive the data packet synchronously and/or to transmit the transmission data packet synchronously.

It is thus possible to achieve an omnidirectional characteristic because the two antenna units are not operated individually, but rather together, specifically in a synchronized manner. In the receiving direction, for example, both of the at least two antenna units are then active at the same time as receivers and each cover one of the sides of the motor vehicle that is assigned to the side surface on which the respective antenna unit is arranged. The received signals are decoded and transmitted to a central control unit at the data or packet level. In the best case, both antenna units have received the same data packet in full, with the result that it is redundant. Such redundant data packets can be discarded by the central control unit. However, if an antenna unit receives a data packet incorrectly, i.e. the CRC checksum does not match the data, this data packet can be transmitted to the central control unit. This is because either the second antenna unit has received the data packet completely and correctly, with the result that the faulty data packet can be discarded, or both antenna units have received the data packet incorrectly, with the result that they can be reconstructed after transmission to the central control unit by combining them at the bit level. In this case, it is advantageous if both antenna units are assigned the same network address.

The at least two antenna units may be arranged on opposite side surfaces of the towing vehicle, in particular a first antenna unit on a right side and a second antenna unit on a left side of a driver's cab of the towing vehicle.

If the two antenna units are arranged on the right and left side of the motor vehicle, they can ensure coverage of the communication for both sides assigned to the side surfaces and thus, if possible, also the entire coverage around the motor vehicle, possibly even including the trailer.

The digital connection of the antenna units via the network interfaces enables the antenna units to be distributed over a wide area across the motor vehicle, whereas such a combination based on wired connections has hitherto been rather unsuitable. A possible connection between the antenna units and the central control unit can be achieved, for example, by Ethernet or BroadR-Reach. It is also possible to approach the antenna units with different transmission media; for example, the antenna units could be connected via USB or with BroadR-Reach. Jitter etc. can be compensated for by synchronizing all antenna units with the central control unit over the respective transmission media. It is also possible to provide packet buffers in the respective antenna units.

The at least two antenna units may be each integrated in an exterior mirror or in a camera arm of a mirror replacement system.

In this case, the mirror replacement system may have at least one camera which is likewise arranged in the camera arm. In one configuration, there is a network concentrator which, during operation, combines signals from this at least one camera and signals from at least one of the antennas of the at least two antenna units for transmission.

At least one of the two antenna units can thus be built into a camera arm of a mirror replacement system with one or more cameras of the mirror replacement system. The antenna unit is digitally connected in this case to the central control unit of the motor vehicle.

If a network concentrator is available, for example a switch, a hub, etc., the digital signals from the camera or the plurality of cameras and the antenna or antennas can be combined for transmission (for example multiplexed, prioritized). Any combination for the placement of plugs and housings is conceivable in this case. For example, all of the components mentioned could have separate housings within the camera arm, but combinations of components and plugs in one housing are also likewise possible. For example, it is conceivable to place the network switch together with one of the antenna units, including the plug-in connection for the cameras, in one housing. The individual components could be supplied with power in this case via one of the digital connections or individually, for example via Power-over-Ethernet, Power-over-Coax, USB, etc.

The antennas of the at least two antenna units may each have an omnidirectional antenna characteristic or a directional antenna characteristic.

At least one of the two antenna units may have at least two antennas, wherein a first of the antennas has an omnidirectional antenna characteristic and a second of the antennas has a directional antenna characteristic.

The antenna unit may have a switching device in this case to switch between the first antenna with the omnidirectional antenna characteristic and the second antenna with the directional antenna characteristic. As a result, both antenna characteristics can be combined with one another, for example, with the result that, for example, a first RF path is placed on the omnidirectional antenna characteristic and a second RF path is placed on the directional antenna characteristic. Depending on the configuration and options of a radio chipset such as a radio module, the two RF paths can be combined with one another using diversity. This makes the system more robust with respect to fading effects while at the same time increasing the link budget due to the directional antenna characteristics. Depending on the design, a plurality of antennas can also have a directional effect and/or a plurality of antennas can also have a directional antenna characteristic or different polarization.

The antennas can be combined with one another using all possible known mechanisms, for example switches or duplexers, in order to find an optimum compromise.

The different antennas can be designed as multiband antennas in order to cover a plurality of services, or individual antennas can be designed specifically for individual services, for example Bluetooth, V2X or W-LAN, etc. In this case, the two antenna units may be assigned different network addresses for operating the individual services.

The individual antenna units may have a plurality of antennas in order to implement diversity. A plurality of bands such as 2.4 GHz, 5 GHz, etc. can also be covered individually or at the same time.

In addition to the possibility of combining antennas of an antenna unit on one of the four side surfaces, there is also the possibility of generating a combination across a plurality of side surfaces. For example, one of the antenna units can use both antennas to implement local MRC diversity as performantly and robustly as possible, while a second of the antenna units has an antenna individually in the same band or service as the opposite antenna unit and also has an antenna that maps a return channel in another band, for example. For this purpose, an assigned chipset may support known features such as Dual Band Simultaneous (DBS) or Dual Band Concurrent (DBC) properties.

Furthermore, it is also possible to use an antenna to proactively search the surroundings for other free bands (scanning). Particular advantages arise depending on the possibilities of the chipsets used for this purpose. For example, MIMO or MU-MIMO as well as beamforming can be implemented.

The switching of the services or the different coverage can be carried out manually or automatically dynamically, so that the greatest possible overall service coverage is guaranteed. For this purpose, it is possible to take into account the available high-level information, environmental data, GPS coordinates, V2X maps and other boundary conditions via protocol regulations, time specifications and resource distributions. In addition, common resources such as memory in a central control unit, for example, can be used across the board.

For V2X communication in particular, an omnidirectional overall antenna characteristic may be required for motor vehicles so that a transmitter and a receiver reach each other in appropriate proximity as early as possible and as often as possible, regardless of their alignment with one another.

In one configuration, the motor vehicle has a trailer which is fastened to the towing vehicle and has a further antenna unit of the antenna network, wherein the further antenna unit may be assigned the same network address as the two antenna units arranged on the towing vehicle. The further antenna unit has at least one antenna and one network interface, wherein the network interface is designed to receive the data packet with the same data content transmitted to the antenna units arranged on the towing vehicle, to provide, on the basis of the specified communication protocol, a transmission data packet which comprises the data content of the received data packet and the assigned network address of the further antenna unit, and to transmit the transmission data packet provided via the antenna.

In addition to the two antenna units on the towing vehicle, a further, remote antenna unit can therefore also be combined to form the antenna network. A position in the sense of an optimum omnidirectional characteristic for the entire motor vehicle is a rear wall of the trailer, with the result that the rear space, which is normally covered by the trailer or shaded in terms of propagation, can be better reached.

The at least one antenna of the further antenna unit therefore may have an omnidirectional antenna characteristic. Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
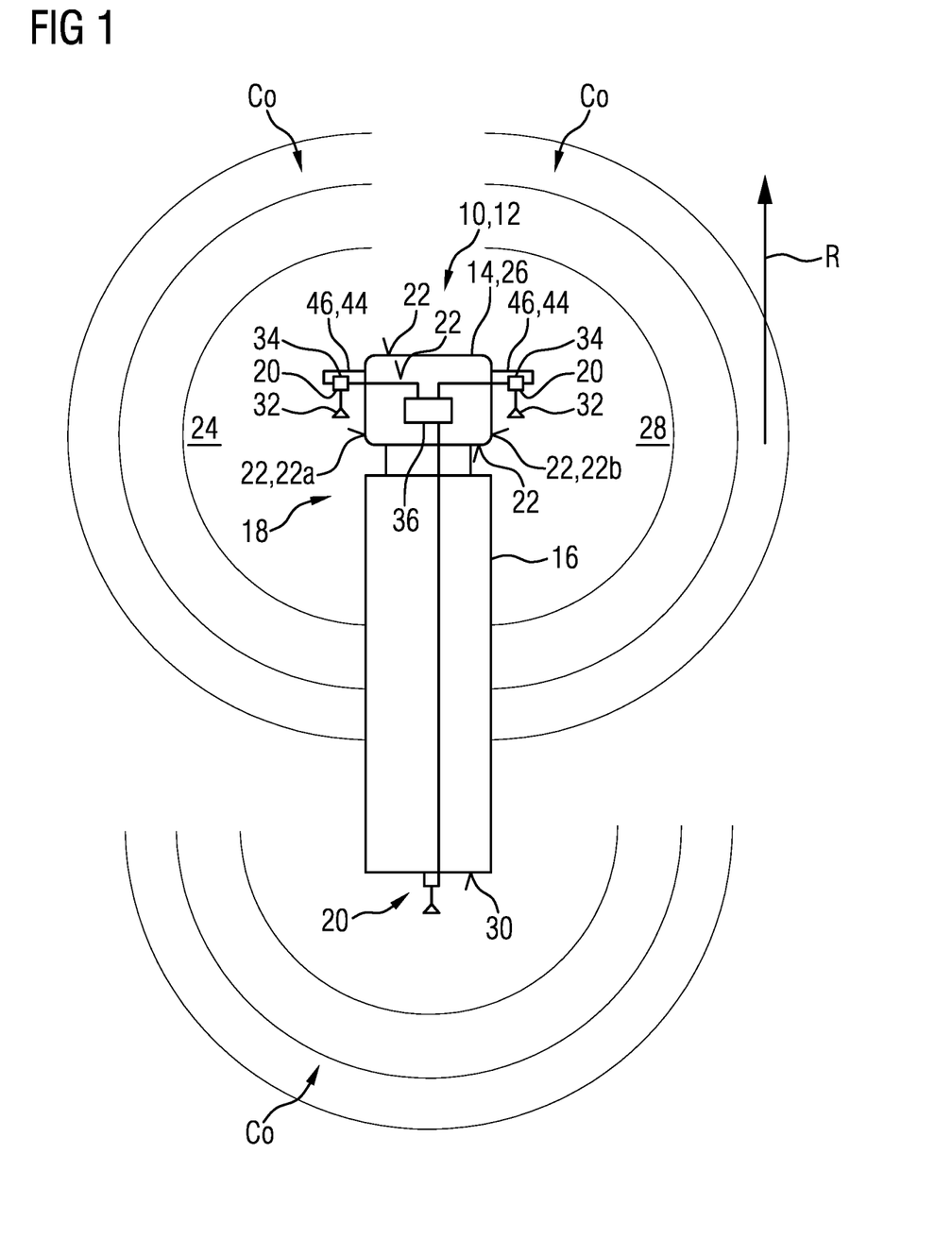
FIG. 1 shows a schematic plan view from above of a motor vehicle with a trailer, a towing vehicle and an antenna network which has a plurality of antenna units.

FIG. 1 shows a schematic plan view from above of a motor vehicle 10 which in the present embodiment is designed as a commercial vehicle 12, namely as a truck with a towing vehicle 14 and a trailer 16. However, all of the following descriptions can also be applied to other motor vehicles 10 such as construction machinery or agricultural machinery such as tractors.

The motor vehicle 10 has an antenna network 18 which, in the present embodiment in FIG. 1, comprises three antenna units 20, wherein two antenna units 20 are arranged on the towing vehicle 14 and one antenna unit 20 is arranged on the trailer 16. In this case, the antenna unit 20 is only optionally provided on the trailer 16.

The towing vehicle 14 is defined by a plurality of side surfaces 22, of which a first side surface 22a in the direction of travel R of the motor vehicle 10 forms a left side 24 of a driver's cab 26 on the towing vehicle 14 and a second side surface 22b in the direction of travel R of the motor vehicle 10 forms a right side 28 of the driver's cab 26. The two antenna units 20 arranged on the towing vehicle 14 are arranged in this case on different side surfaces 22, namely one on the left side 24 and one on the right side 28 of the driver's cab 26.

The third, only optionally provided, antenna unit 20 of the antenna network 18 is arranged on a rear side 30 of the trailer 16.

In the present embodiment, all antenna units 20 of the antenna network 18 are assigned an identical network address, and each of the antenna units 20 has at least one antenna 32 and one network interface 34. The antenna units 20 are digitally connected to a central control unit 36. The network interfaces 34 of the antenna units 20 are designed in such a way that they can receive a data packet with the same data content transmitted to all antenna units 20, can respectively provide, on the basis of a specified communication protocol, a transmission data packet which comprises the data content of the received data packet and the assigned identical network address of all antenna units 20, and can transmit the transmission data packet provided via the respective antenna 32 of the assigned antenna unit 20. Since the transmitted data packet can be received via the respective network interface 34 and a digital connection of the antenna units 20 is therefore involved, the antenna units 20 can be arranged at any position on a motor vehicle 10. Since all of the antenna units 20 shown transmit their transmission data packets with the same network address, more or less multipath reception can take place on a receiving side, i.e. a plurality of transmission data packets arrive, and thus a more reliable communication connection is possible.

For this purpose, the antenna units 20 may be designed to receive the data packet synchronously and/or to transmit the transmission data packet synchronously.

Figure 2:
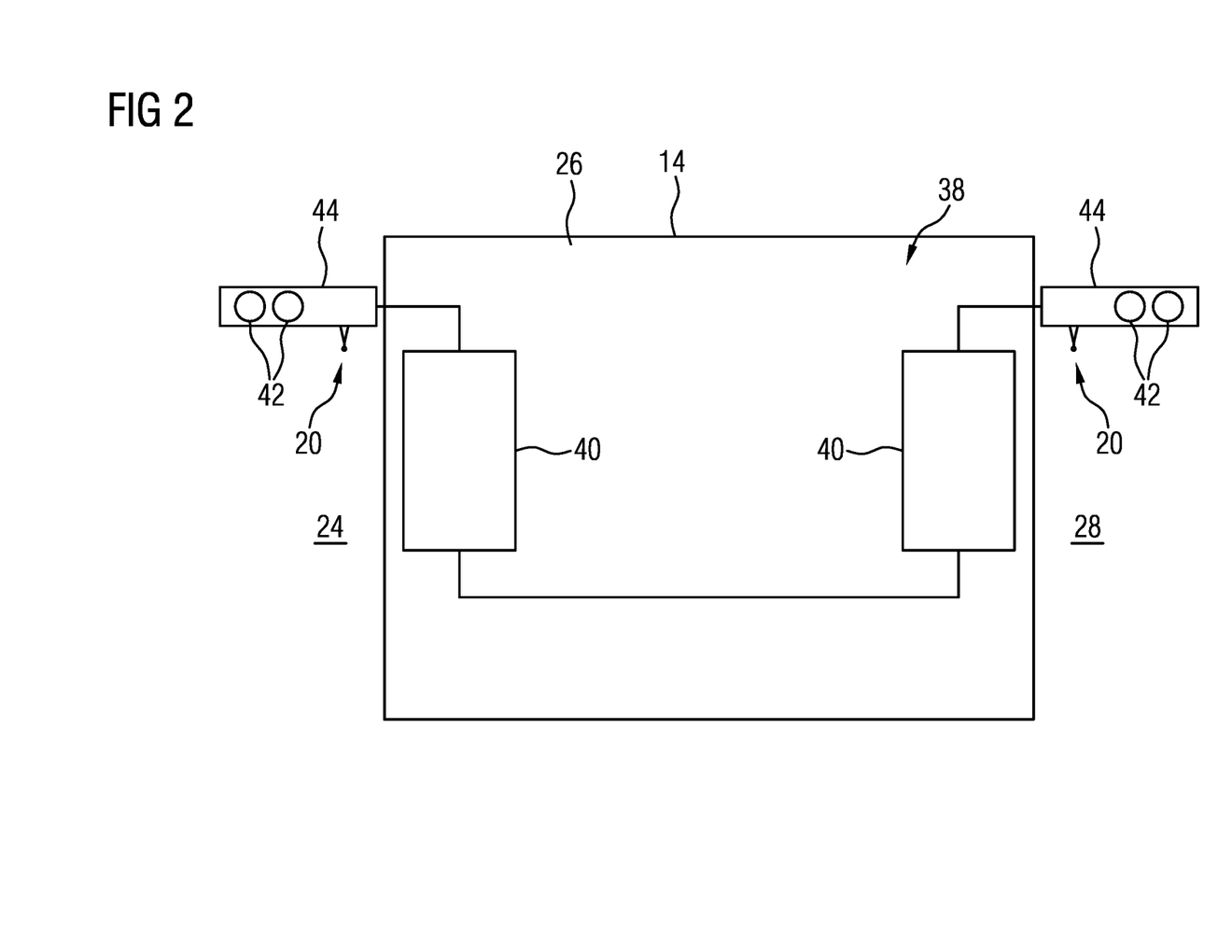
FIG. 2 shows a schematic illustration of a mirror replacement system which is arranged in the motor vehicle from FIG. 1.

In one configuration of the motor vehicle 10, it is a commercial vehicle 12 which has a mirror replacement system 38 which is schematically illustrated in FIG. 2. The mirror replacement system 38 is preferably located on the towing vehicle 14 and mostly has two monitors 40 which each form a display for the left side 24 and the right side 28 of the driver's cab 26. The monitors 40 show recordings from cameras 42 which are arranged outside the driver's cab 26 on a corresponding camera arm 44 and produce recordings of the surroundings. As shown in FIG. 2, the antenna units 20 are advantageously integrated in such a camera arm 44. Alternatively or additionally, integration of the antenna units 20 in a simple exterior mirror 46 is of course also possible.

An ECU (not shown) is present in each of the monitors 40 of the mirror replacement system 38, wherein the ECUs are connected to one another by means of Ethernet or BroadR-Reach. In one variant, the mirror replacement system 38 can also consist of a central ECU instead of two ECUs behind the monitors 40 in each case. The required cable runs to the camera arms 44 are thus minimized. The mirror replacement system 38 with the two ECUs shown can reach both antenna units 20. The antenna units 20 can be designed in this case in such a way that they enable the integration of V2X, for example, wherein the resources of the mirror replacement system 38 are used to implement a V2X system or forwarding at packet level to other ECUs or from other ECUs to the antenna units 20. Likewise, the antenna units 20 in FIG. 2 can implement wireless video transmission in a particularly suitable manner in order to integrate, for example, an external wireless mobile reversing camera in a performant and resource-optimized manner.

Due to the digital connection, no compensator, i.e. no post-amplification in the analog area, is necessary, while the amplifier and LNA directly in the vicinity of the antennas 32 allow optimum performance without power losses and enable in the first place an architecture in a remote antenna unit 20 on the rear side 30 of the trailer 16.

As already mentioned, instead of in the camera arms 44, the antenna units 20 can also be arranged on conventional exterior mirrors 46 or simply on the side of the driver's cab 26 or on the roof thereof.

It is possible to accommodate technologies such as UWB, 433 MHz modules for TPMS (Tire Pressure Monitoring System), key radio, etc.

Figure 3:
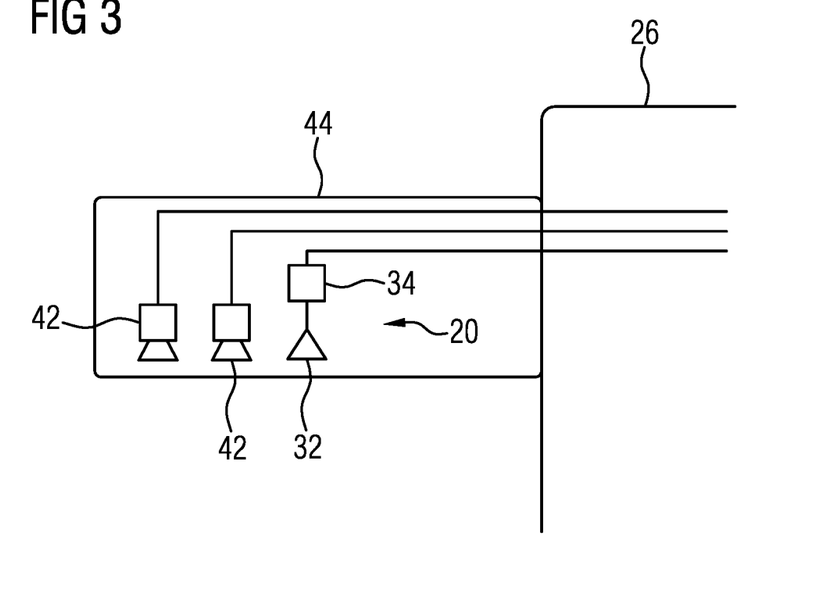
FIG. 3 shows a schematic detailed illustration of the motor vehicle from FIG. 1 in the area of the towing vehicle in a first embodiment.

FIG. 3 shows a schematic detailed illustration of a first embodiment of an arrangement of an antenna unit 20 in a camera arm 44 of the mirror replacement system 38. Both the cameras 42, which are arranged in the camera arm 44, and the antenna unit 20 are digitally connected separately in the motor vehicle 10 in this case.

Figure 4:
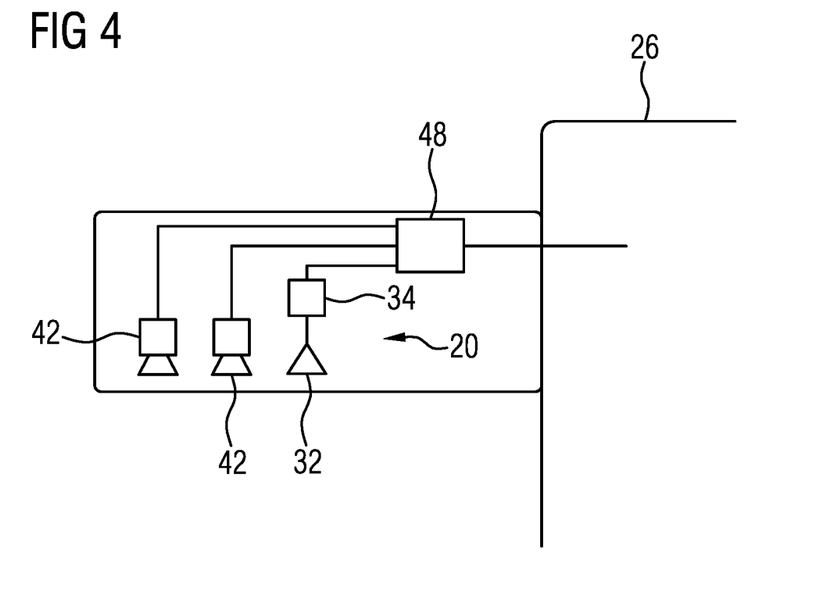
FIG. 4 shows a schematic detailed illustration of the motor vehicle from FIG. 1 in the area of the towing vehicle in a second embodiment.

FIG. 4 shows a schematic detailed illustration of a second embodiment of an arrangement of an antenna unit 20 in a camera arm 44 of the mirror replacement system 38, wherein a network concentrator 48 is provided and, during operation, combines both the signals from the two cameras 42 and the signals from the antenna unit 20 for transmission.

Figure 5:
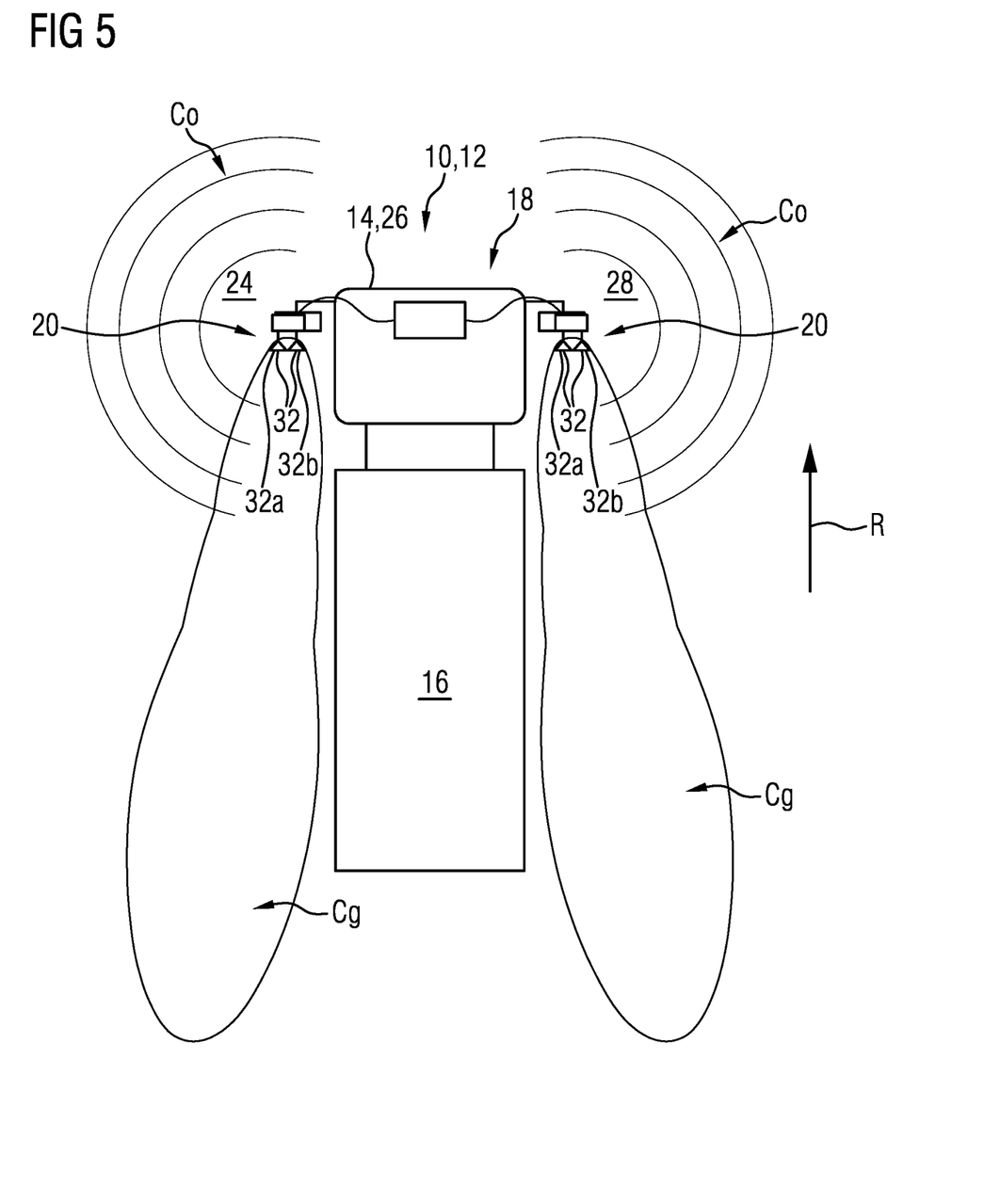
FIG. 5 shows a schematic plan view from above of the motor vehicle from FIG. 1 with a plurality of antenna units which have antennas with different antenna characteristics.

FIG. 5 shows a schematic plan view of the motor vehicle 10 from FIG. 1, in which an antenna unit 20 with two antennas 32 in each case is arranged on each side 24, 28, wherein, in each antenna unit 20, a first antenna 32a has an omnidirectional antenna characteristic Co and a second antenna 32b has a directional antenna characteristic Cg. For each side 24, 28 of the motor vehicle 10, there are thus two different antenna characteristics Co, Cg, wherein the directional antenna characteristic Cg has a strong directional effect, in this case to the rear, which enables optimized data transmission to the rear, e.g. for a camera 42 with wireless communication that is fitted to the rear of the motor vehicle 10. In addition, video data, for example, can be streamed more performantly to other motor vehicles driving behind the motor vehicle 10. For example, in platoon applications in the field of automated driving, communication in the vehicle group can be optimized as a result.

Figure 6:
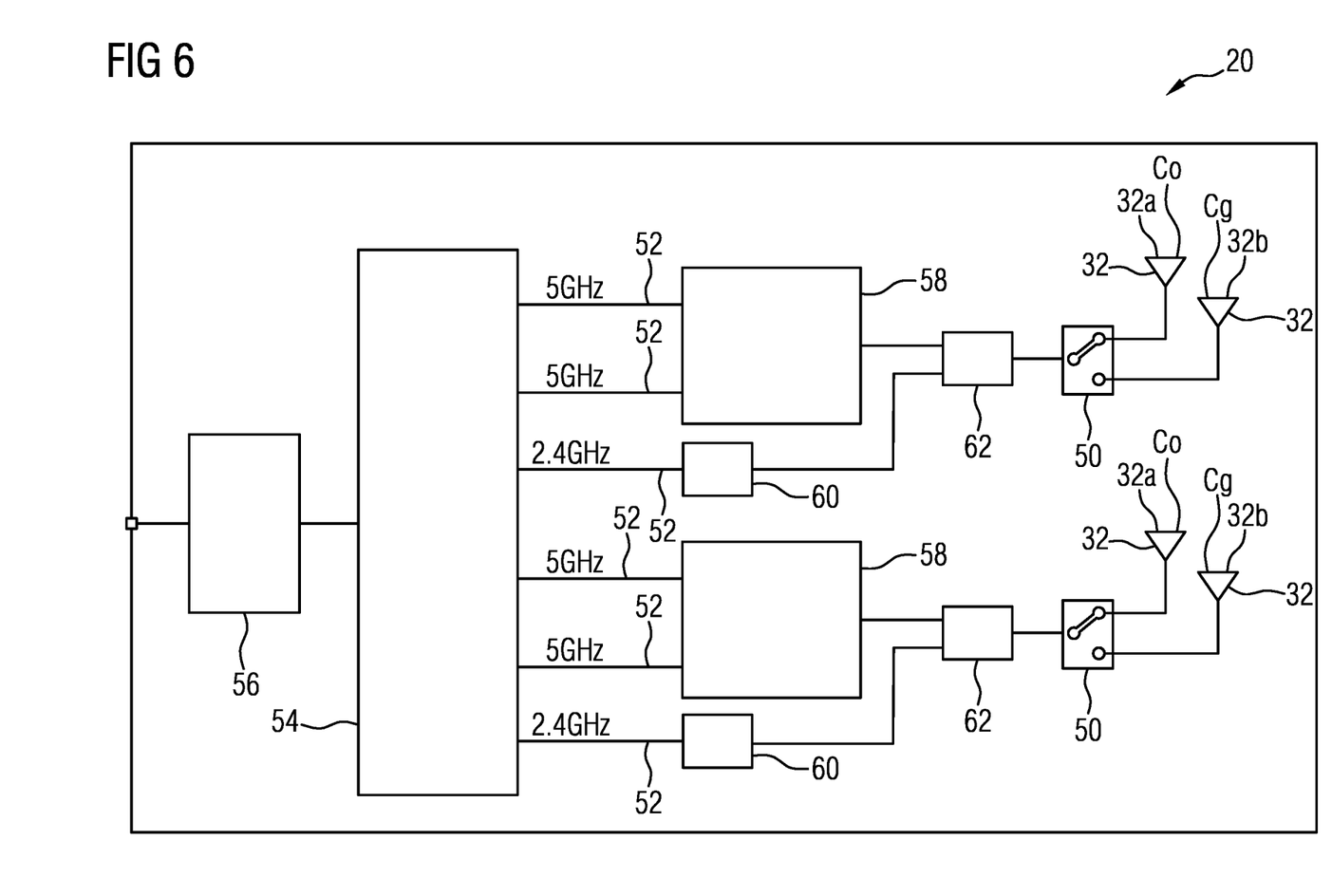
FIG. 6 shows a schematic block diagram for one of the antenna units from FIG. 5.

FIG. 6 shows a schematic block diagram of one of the antenna units 20 from FIG. 5.

The antenna unit 20 in FIG. 6 has antennas 32 which can be switched for different applications, for which a switching device 50 is provided in each case. It is possible in this case to switch between an antenna 32 with an omnidirectional antenna characteristic Co and an antenna 32 with a directional antenna characteristic Cg. In the block diagrams in FIG. 6, it is possible to combine the antennas 32 via different RF paths 52. The antenna unit 20 in FIG. 6 has a WIFI chipset 54 which is controlled via a bus connection 56. The WIFI chipset 54 is a 2×2 variant, with the RF paths (5 GHz reception and transmission and 2.4 GHz) each being present twice. In the present embodiment, the WIFI chipset 54 supports both conventional WLAN and V2X or DSRC (Dedicated Short Range Communication). For the 5 GHz RF paths 52, there is a front end 58 which has an external amplifier, an LNA (Low Noise Amplifier), a switchable filter for DSRC and switching between transmission and reception.

A bandpass filter 60 is connected upstream of the 2.4 GHz RF path 52. The RF paths 52 are combined via a duplexer 62, with the result that the two antennas 32 in each case can be fed to the RF paths 52 in each case.

The bus connection 56 or network connection is only shown as an example; the connection can also take place, for example, via a serializer or repeater. The antenna networks 20 could also be connected directly, e.g. via USB. Ideally, no external processor is required in the antenna units 20, but only the WIFI chipset 54 with its internal processor.

If the antenna units 20 locally have a plurality of antennas 32, it is possible to implement diversity, to cover a plurality of bands such as 2.4 GHz, 5 GHz individually or simultaneously and to provide different antenna characteristics Co, Cg. Diversity will bring only a slight benefit if the right side 28 and the left side 24 of the motor vehicle 10 were to be combined in an analog manner. This would be expected because the signals on the right side 28 and the left side 24 are different since they are exposed to different propagation conditions due to the presence of houses, automobiles, etc. Local diversity and subsequent diversity of the right side 28 and the left side 24 on the digital level, on the other hand, result in significant performance gains, for example in the case of useful, signaling or protocol data. The possible combination of faulty data packets from the two sides 24, 28 increases the robustness. It is also possible to use different antenna characteristics Co, Cg and combine them dynamically. It can be possible here to assign different network addresses to the antenna units 20 in order to thus be able to operate different services.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A motor vehicle comprising:
a towing vehicle defined by at least four side surfaces; and
an antenna network with at least two antenna units which are assigned an identical network address, wherein the at least two antenna units are arranged on different side surfaces of the at least four side surfaces of the towing vehicle, wherein the at least two antenna units each have at least one antenna and one network interface, wherein each of the network interfaces is designed for:
receiving a data packet with the same data content transmitted to the at least two antenna units;
providing respectively, on the basis of a specified communication protocol, a transmission data packet which comprises the data content of the received data packet and the assigned identical network address of the at least two antenna units; and
transmitting the transmission data packet provided via the respective antenna.

2. The motor vehicle as claimed in claim 1, wherein the at least two antenna units are designed to at least one of: receive the data packet synchronously and to transmit the transmission data packet synchronously.

3. The motor vehicle as claimed in claim 1, wherein the at least two antenna units are arranged on opposite side surfaces of the towing vehicle.

4. The motor vehicle as claimed in claim 3, wherein a first antenna unit is on a right side of a driver's cab of the towing vehicle and a second antenna unit is on a left side of a driver's cab of the towing vehicle.

5. The motor vehicle as claimed in claim 1, wherein the at least two antenna units are each integrated in an exterior mirror or in a camera arm of a mirror replacement system.

6. The motor vehicle as claimed in claim 1, further comprising
   at least one camera of a mirror replacement system; and
   a network concentrator which, during operation, combines signals from the at least one camera and signals from at least one of the antennas of the at least two antenna units for transmission.

7. The motor vehicle as claimed in claim 1, wherein the antennas of the at least two antenna units each have an omnidirectional antenna characteristic or a directional antenna characteristic.

8. The motor vehicle as claimed in claim 1, wherein at least one of the antenna units has at least two antennas, wherein a first of the antennas has an omnidirectional antenna characteristic and a second of the antennas has a directional antenna characteristic.

9. The motor vehicle as claimed in claim 8 wherein the antenna unit has a switching device to switch between the first antenna with the omnidirectional antenna characteristic and the second antenna with the directional antenna characteristic.

10. The motor vehicle as claimed in claim 1, further comprising:
    a trailer which is fastened to the towing vehicle; and
    a further antenna unit of the antenna network, wherein the further antenna unit is assigned the same network address as the two antenna units arranged on the towing vehicle, wherein the further antenna unit has at least one antenna and one network interface, wherein the network interface of the further antenna unit is designed for:
    receiving the data packet with the same data content transmitted to the antenna units arranged on the towing vehicle;
    providing, on the basis of the specified communication protocol, a transmission data packet which comprises the data content of the received data packet and the assigned network address of the further antenna unit; and
    transmitting the transmission data packet provided via the antenna.

11. The motor vehicle as claimed in claim 10, wherein the at least one antenna of the further antenna unit has an omnidirectional antenna characteristic.

* * * * *